(12) United States Patent
Mizuno

(10) Patent No.: US 7,841,059 B2
(45) Date of Patent: *Nov. 30, 2010

(54) MOLD ATTACHING/DETACHING APPARATUS AND MOLD ATTACHING/DETACHING METHOD

(75) Inventor: Kouji Mizuno, Aichi-ken (JP)

(73) Assignee: Star Seiki Co., Ltd., Nagoya-Shi (JP)

( * ) Notice: Subject to any disclaimer, the term of this patent is extended or adjusted under 35 U.S.C. 154(b) by 202 days.

This patent is subject to a terminal disclaimer.

(21) Appl. No.: 12/169,957

(22) Filed: Jul. 9, 2008

(65) Prior Publication Data

US 2009/0022841 A1  Jan. 22, 2009

(30) Foreign Application Priority Data

Jul. 19, 2007  (JP) ............................. 2007-187788

(51) Int. Cl.
   B29C 33/30   (2006.01)
   B22D 17/20   (2006.01)
(52) U.S. Cl. .................... 29/428; 164/342; 425/192 R; 425/195
(58) Field of Classification Search ............. 425/192 R, 425/195; 164/342; 29/428
   See application file for complete search history.

(56) References Cited

U.S. PATENT DOCUMENTS 4,790,739 A * 12/1988 Manfredi ................ 425/192 R
6,572,356 B2 * 6/2003 Seger ..................... 425/192 R
7,258,539 B2 * 8/2007 Lowe et al. ............. 425/192 R
7,559,265 B2 * 7/2009 Mizuno ................... 74/490.06

FOREIGN PATENT DOCUMENTS

JP   2005-246634 A   9/2005

* cited by examiner

*Primary Examiner*—James Mackey
(74) *Attorney, Agent, or Firm*—Holtz, Holtz, Goodman & Chick, PC

(57) ABSTRACT

As cams provided on platen-side attachments move from a lock-releasing position to a locking position while the ball-supporting members of the platen-side attachments remain inserted in the ball-receiving members of mold-side attachments, locking balls sliding in inclined-locking grooves are moved outward in a direction at right angles to the direction in which the cams move, and are set in engaging-locking grooves and abut on the curved parts of the engaging-locking grooves. Therefore, the mold-side attachments are closely attached and fixed to the platen-side attachments. As the cams move from the locking position to the lock-releasing position, the pushing balls sliding in inclined-pushing grooves are moved outward in a direction at right angles to the direction in which the cams move, and abut on the curved parts of the engaging-pushing grooves. In this case, the mold-side attachments can project from the platen-side attachments.

3 Claims, 9 Drawing Sheets

MOLD ATTACHING/DETACHING APPARATUS AND MOLD ATTACHING/DETACHING METHOD

BACKGROUND OF THE INVENTION

1. Field of the Invention

The present invention relates to a mold attaching/detaching apparatus and a method for attaching/detaching metal molds to and from the stationary platen and movable plate of a molding machine such as a resin molding machine or a die casting machine.

2. Description of the Related Art

A fixing apparatus is disclosed in, for example, JP 2005-246634A1, which is used as an apparatus for respectively fixing a metal mold to the stationary platen and movable plate of a resin molding machine, for example. This fixing apparatus has two electromagnet devices that are provided on the stationary platen and the movable plate of the resin molding machine, respectively. When supplied with a current, the electromagnet devices generate magnetic fields, which magnetically attract and secure the metal molds to the resin molding machine.

The fixing apparatus can easily attach and detach the metal molds, merely by supplying an electric current to the electromagnet devices and stopping the current supply to the electromagnet devices, irrespective of the position where the metal molds are secured to the stationary platen and the movable plate. This can enhance the efficiency of attaching and detaching the metal molds.

Various metal molds different in size must be attached to the resin molding machine, in accordance with the types of moldings to be formed. If the metal molds to be attached are small, the area at which they contact the stationary platen and movable plate is small, and the magnetic attractive force is reduced. Inevitably, the small metal molds cannot be firmly secured to the resin molding machine.

In the case where small metal molds are so secured to the resin molding machine by the electromagnetic devices, they may partially easily move from the stationary platen and the movable plate, respectively, due to the force applied to them as the molding is pulled from them. When the metal molds partially so move from the stationary platen and movable plate, the magnetic force acting on the metal molds fast decreases, possibly causing the molds to fall from the stationary platen and movable plate. Consequently, the molding cannot proceed safely, and the molding efficiency is impaired.

In order to keep the two metal molds to be secured to the stationary platen and movable plate, an electric current must be continuously supplied to both electromagnet devices. This results in an increase in power consumption, ultimately increasing the running cost of the fixing apparatus.

Further, in order to keep both metal molds secured to a holding plate to attain security of operation even at the power failure, a mechanical fixing apparatus or a vacuum suction apparatus must be used in addition to the electromagnetic devices. However, if such a fixing apparatus is arranged with respect to the stationary platen and the movable plate, it requires a large installation space. A sufficient installation space is available if the resin molding machine has a large stationary platen and a large movable plate, but such space can hardly be available if the resin molding machine is small.

Assume that a vacuum suction apparatus is used and secured to the holding plate. Then, not only a sufficient installation space must be provided as pointed out above, but also the vacuum suction apparatus must be continuously driven in order to keep holding the molds. Air consumption inevitably increases, and maintenance cost increase accordingly.

The metal molds may be fixed to the stationary platen and the movable plate with bolts. In this case, the operator must keep pushing the metal molds onto the stationary platen and the movable plate, until the bolts are tightened, firmly fixing the molds to the stationary platen and the movable plate with the bolts. To detach the metal molds from the stationary platen and the movable plate, the operator must move the molds from the stationary platen and the movable plate, while loosening the bolts. Thus, much time and labor are required to attach and detach the metal molds to and from the stationary platen and the movable plate.

SUMMARY OF THE INVENTION

An object of the present invention is to provide a mold attaching/detaching apparatus that consumes less power and less air than in the case where the metal molds are fixed with a magnetic force to the stationary platen and the movable plate, thereby to reduce the running cost of the apparatus. Another object of the invention is to provide a mold attaching/detaching apparatus that prevents the metal molds from partially moving away from the stationary platen and the movable plate, due to the force applied to them as the molding is formed or pulled from them, and prevents the metal molds from falling. Still another object of the invention is to provide a mold attaching/detaching apparatus that can easily attach and detach the metal molds to and from the stationary platen and the movable plate, without the operator's labor of pushing the molds onto the stationary platen and the movable plate or pulling the molds from the platen and plate, thereby to enhance the efficiency of attaching and detaching the molds to and from the stationary platen and the movable plate.

DETAILED DESCRIPTION OF THE PREFERRED EMBODIMENTS

An embodiment of the present invention, which is for use in a molding machine, will be described with reference to the accompanying drawings.

Figure 1:
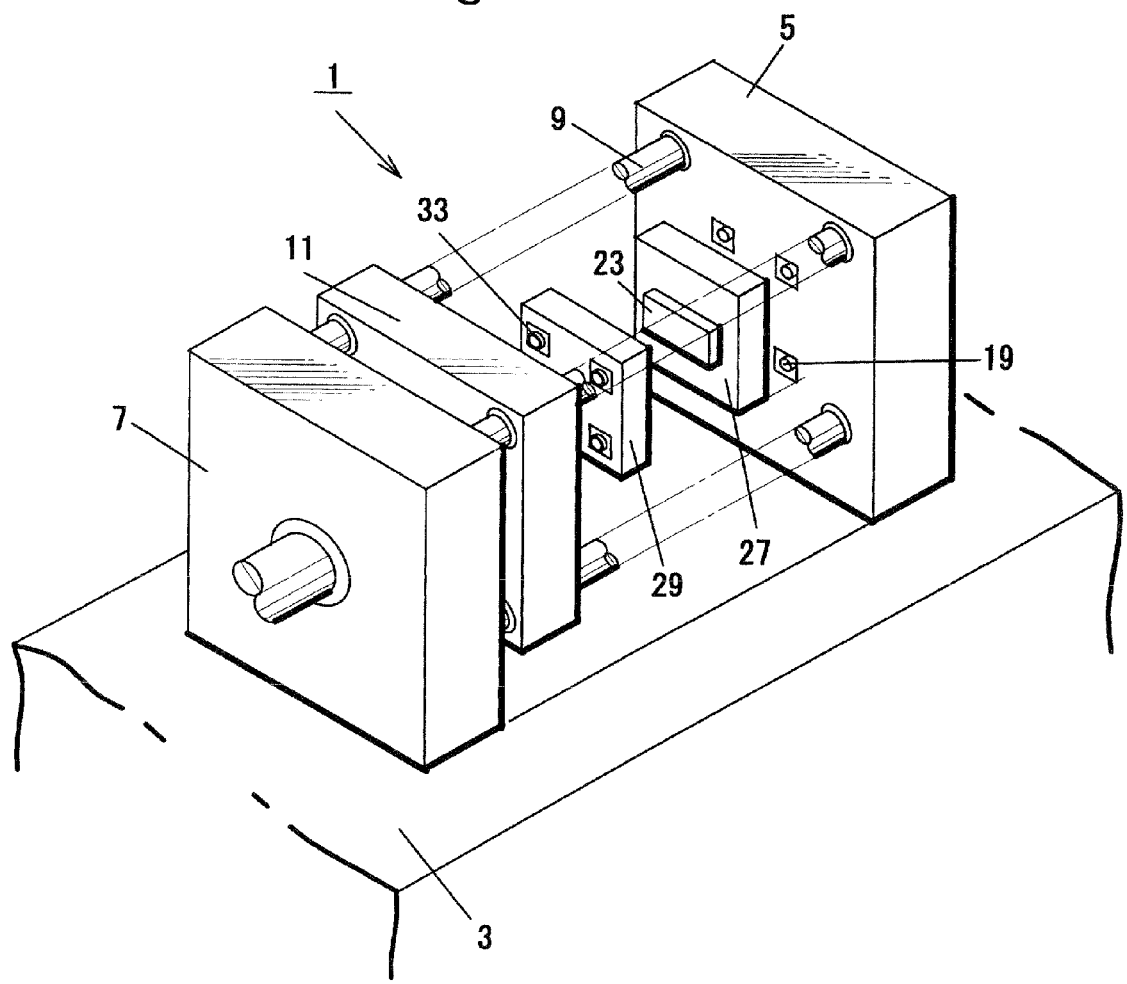
FIG. 1 is a diagram explaining the positions where metal molds are secured in a resin molding machine.
Figure 2:
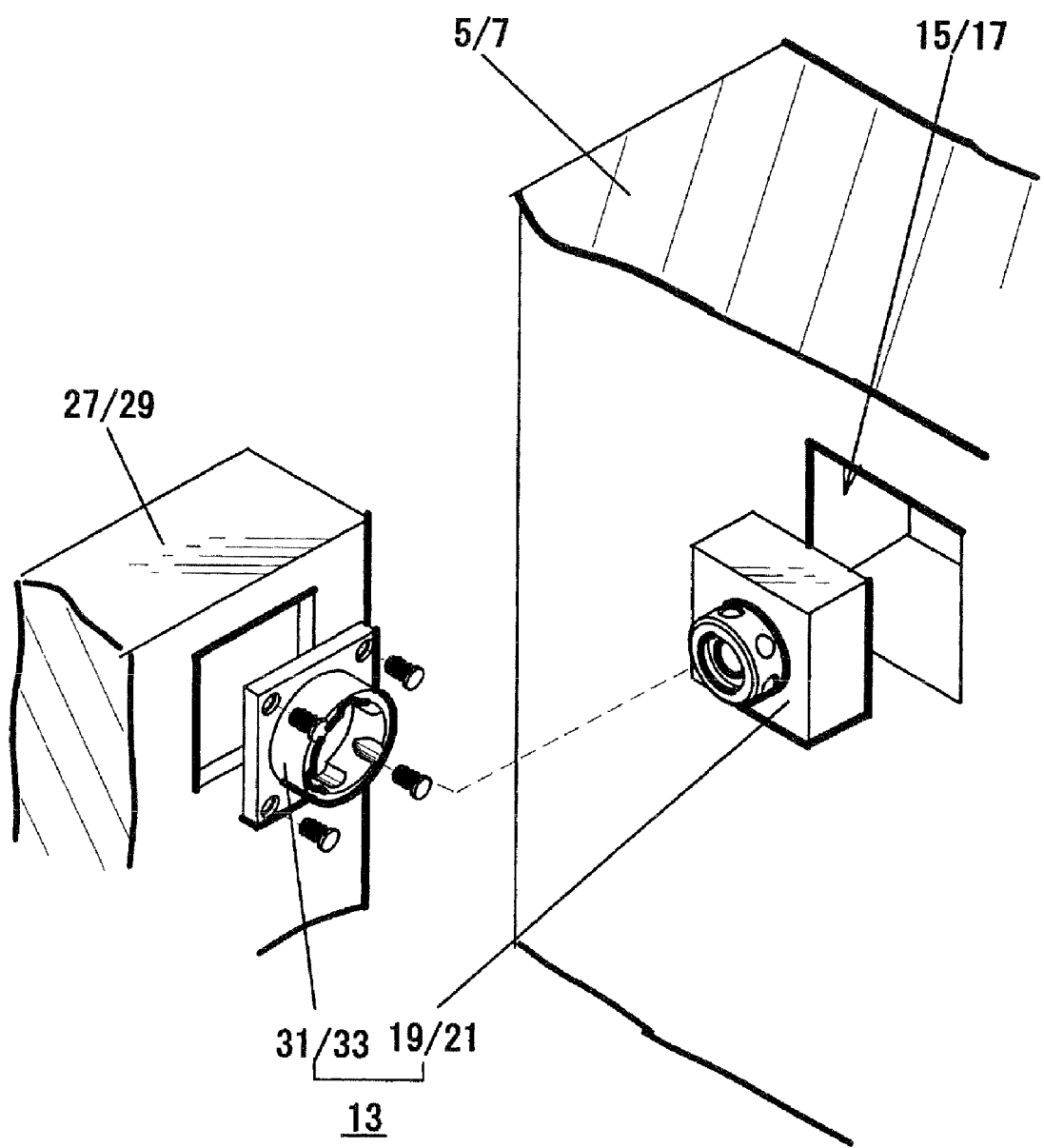
FIG. 2 is a diagram explaining how a mold attaching/detaching apparatus according to this invention attaches metal molds to the stationary platen, movable plate and holding plate of the resin molding machine.

First, a resin molding machine 1 will be described. As seen from FIGS. 1 and 2, the resin molding machine 1 has the structure known in the art. On a main frame 3, a stationary platen 5 and a movable platen 7 are provided, spaced from each other and opposed to each other. Tie bars 9 are provided between the stationary platen 5 and the movable platen 7, each extending laterally. A movable platen 11 is mounted on and supported by the tie bars 9 and can slide in the axial direction of the tie bars 9.

A mold clamping device (not shown), such as a hydraulic cylinder, is provided on the main frame 3 and is coupled to the movable platen 11. As the mold clamping device operates, the movable platen 11 is moved in the axial direction of the tie bars 9, pressing a movable metal mold 25 (later described) into a stationary metal mold 23. An injection apparatus (not shown) is incorporated in the stationary platen 5 provided on the main frame 3. The injection apparatus injects molten synthetic resin into the cavity, which is defined by the metal molds 23 and 25 and will be described later. A molding is thereby formed.

Two holding plates 27 and 29 that hold the stationary mold 23 and the movable mold 25, respectively, can be attached to and detached from those surfaces of the stationary platen 5 and the movable platen 11, which face each other, by means of mold attaching/detaching apparatuses 13. One mold attaching/detaching apparatus 13 is composed of platen-side attachments 19 fitted in the recesses 15 made in the stationary platen 5, and mold-side attachments 31 secured to the holding plate 27. The other mold attaching/detaching apparatus 13 is composed of platen-side attachments 21 fitted in the recesses 17 made in the movable platen 11, and mold-side attachments 33 secured to the holding plate 29.

The platen-side attachments 19 secured to the stationary platen 5 are identical in structure to the platen-side attachments 21 secured to the movable platen 11. The mold-side attachments 31 secured to the holding plate 27 are identical in structure to the mold-side attachments 33 secured to the holding plate 29. Hence, the components of both platen-side attachments 19 and 21 are designated by the same reference numbers, and those of both mold-side attachments 31 and 33 are designated by the same reference numbers, as well.

Figure 3:
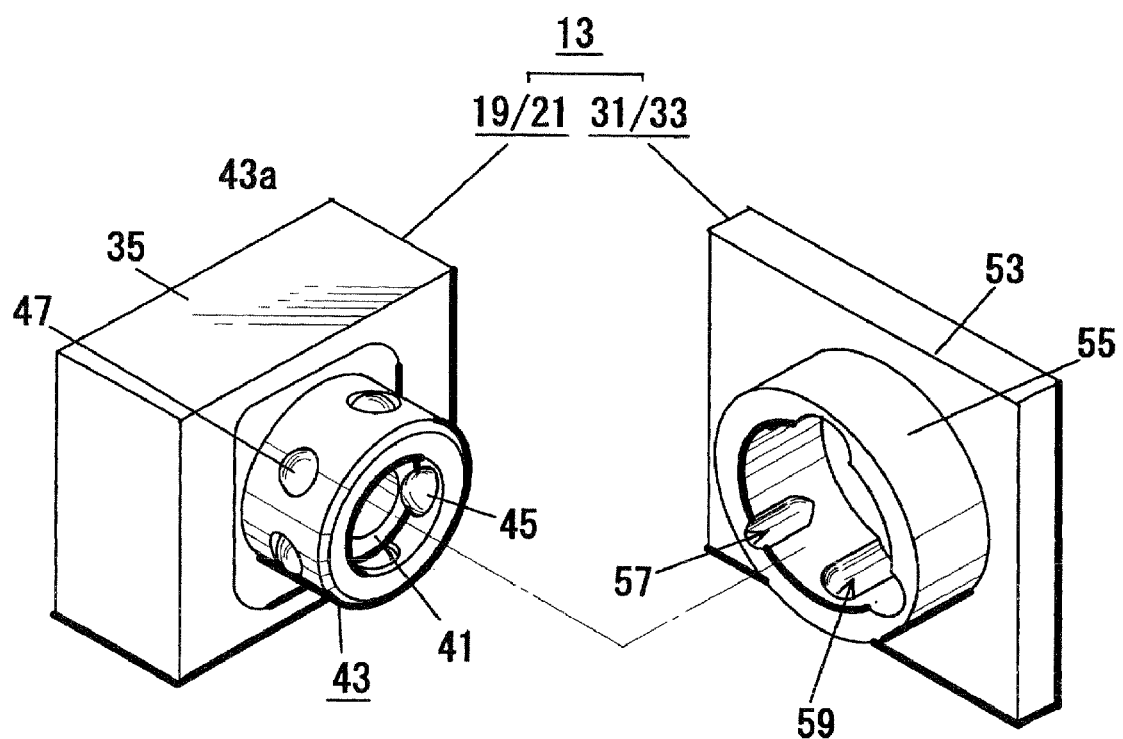
FIG. 3 is a perspective view outlining the configuration of the mold attaching/detaching apparatus.
Figure 4:
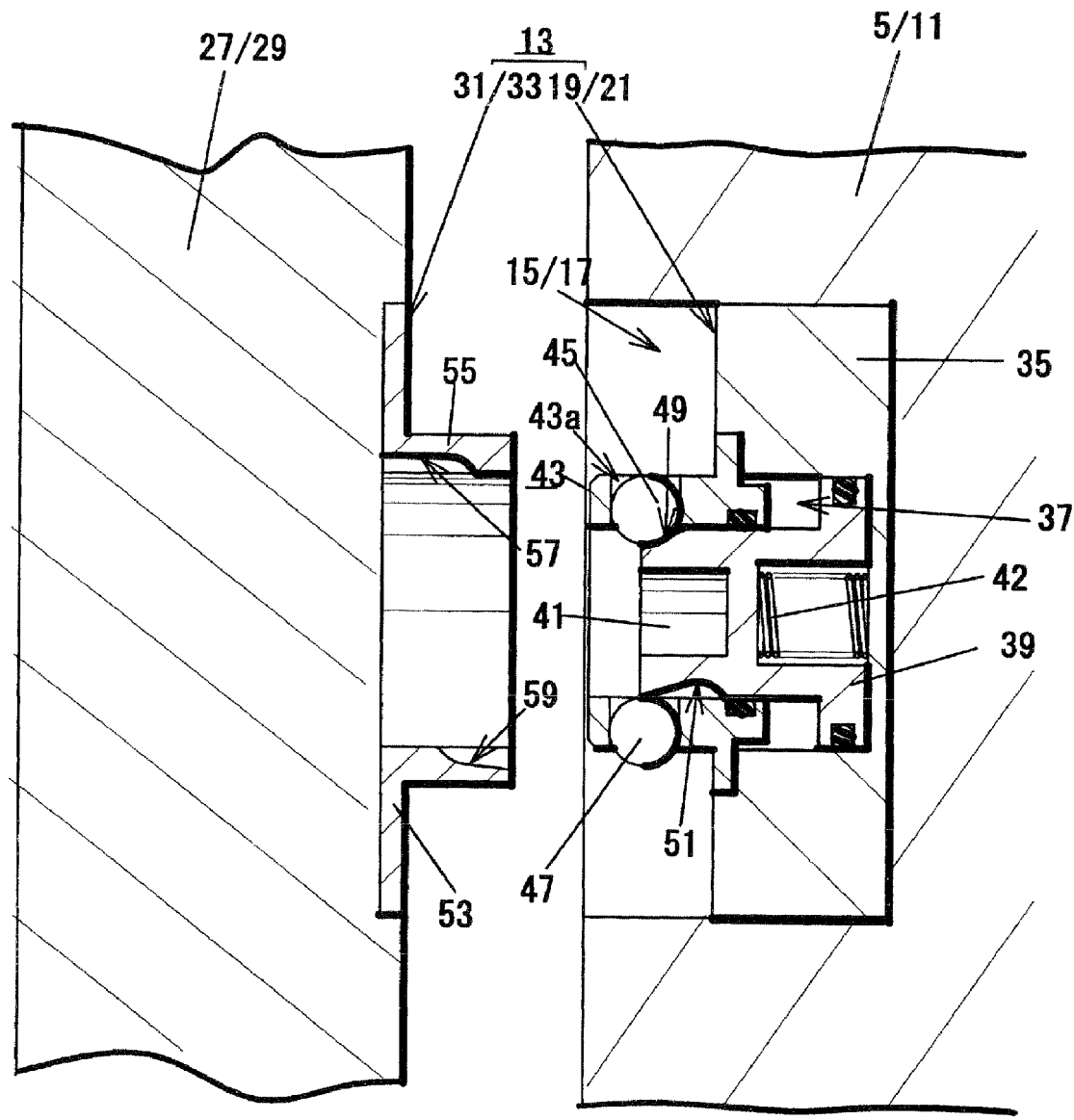
FIG. 4 is a longitudinal sectional view of the mold attaching/detaching apparatus, taken along the axis of the apparatus.
Figure 5:
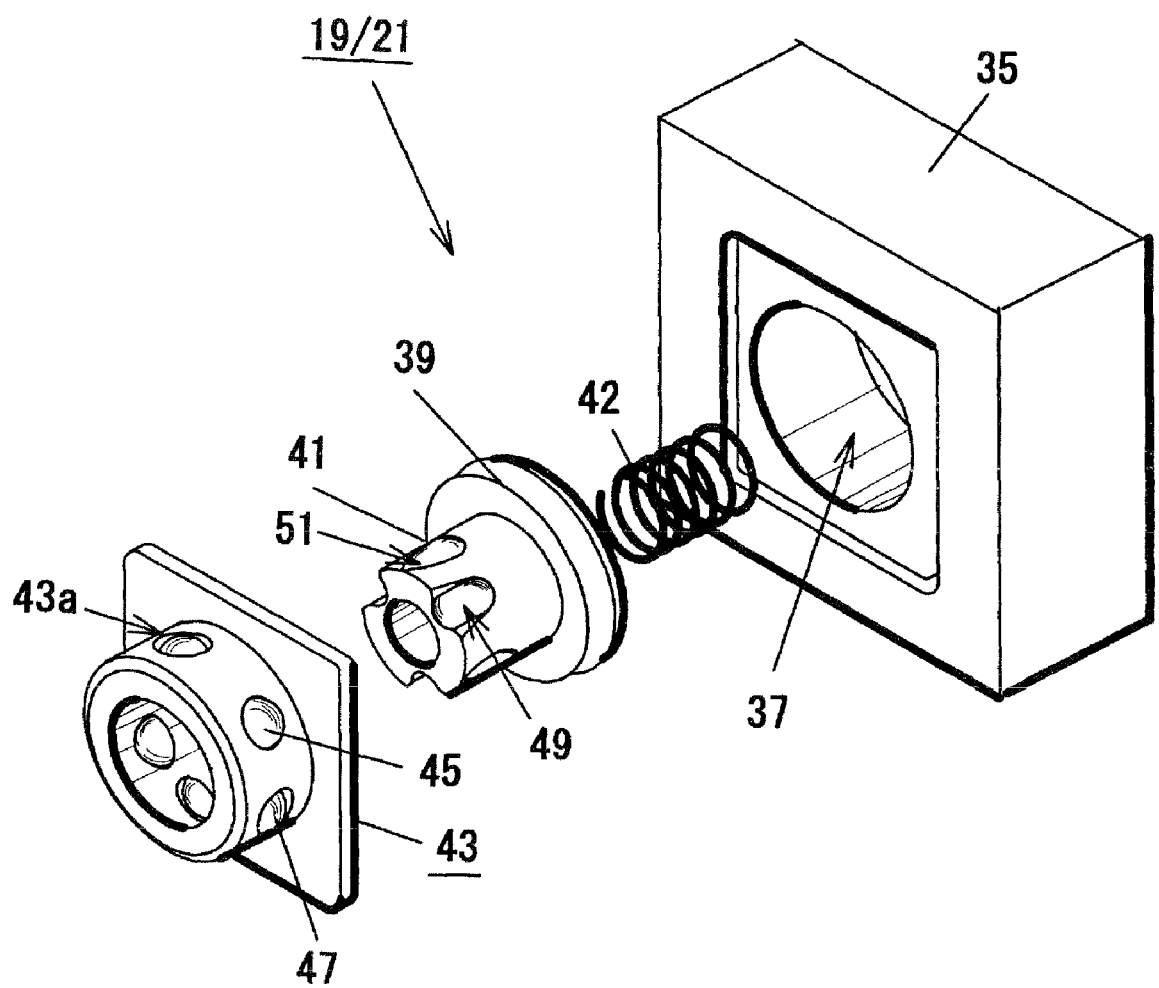
FIG. 5 is an exploded perspective view of a platen-side attachment.

As shown in FIGS. 3 to 5, the platen-side attachments 19 are fixed in the recesses 15 made in the corner parts of the stationary platen 5, and the platen-side attachments 21 are fixed in the recesses 17 made in the corner parts of the movable platen 11. The platen-side attachments 19 and 21 each have a main body 35. The main body 35 of each platen-side attachment has a cylinder chamber 37 in the center part. The cylinder chamber 37 constitutes a part of an operating member. A piston 39, which is component of the operating member, is supported in the cylinder chamber 37. The piston 39 can slide in its axial direction. A cam 41, which will be described later, is mounted on the piston 39. A compression spring 42, i.e., elastic member, is provided in the positive pressure chamber provided in the cylinder chamber 37. The elastic force of the compression spring 42 biases the piston 39, and hence the cam 41, toward the mold-side attachment 31 or 33 (that is, toward a locking position).

The positive pressure and negative pressure chambers of the cylinder chamber 37 are connected to air passages (not shown). Supply and discharge of air for each of the positive pressure and negative pressure chambers are switched, so that the piston 39 is moved back and forth in its axial direction.

A ball-supporting cylindrical member 43 is firmly fixed to the main body 35 so as the cam 41 are inserted therein to move in the axial direction. The member 43 has a cylindrical part 43a, which has, for example, six or eight ball-supporting holes 43b that are arranged in equal distance around the axis of the cylindrical part 43a. (In FIG. 5, the cylindrical part 43a has six ball-supporting holes 43b.) The ball-supporting holes 43b have an axis that extends at right angles to the axis of the cylindrical part 43a. A locking ball 45 is supported in every other ball-supporting hole 43b. A pushing ball 47 is supported in each of the remaining ball-supporting holes 43b. The pushing ball 47 can move in the radial direction of the cylindrical part 43a (in the direction at right angles to the axis of the cylindrical part 43a).

The ball-supporting holes 43b has, at an outer circumference thereof, a diameter that is a slightly smaller than the diameter of the locking ball 45 and that of the pushing ball 47. Therefore, the ball-supporting holds 43b prevent the balls 45 and 47 from slipping outward.

Inclined-locking grooves 49 are cut in the outer circumferential surface of that part of the cam 41, which is located in the cylindrical part 43a. Each inclined-locking groove 49 inclines at a prescribed angle, gradually becoming shallow from the distal end toward the proximal end, has an arc or V-shaped cross section, and has an arcuate bottom approximately corresponds to the curved surface of the locking ball 45.

Curved-pushing grooves 51 are cut in the outer circumferential surface of the cam 41. Each curved-pushing groove 51 gradually becomes deep from the distal end toward the middle part of the cam 41, and has a cross section formed as either an arc- or V-shaped, as viewed in the direction at right angles to the axis of the cam 41. The curved-pushing grooves 51 can be so positioned to oppose the pushing balls 47 supported in the ball-supporting holes 43b.

The inclined-locking grooves 49 and the curved-pushing groove 51 may have a shape other than the one specified above. For example, they may be tapered planar grooves or pyramidal depressions having sides inclined at a prescribed angle.

The locking balls 45 move in the ball-supporting holes 43b outward in the radial direction, while sliding in the inclined-locking grooves 49, as the cam 41 moves from the lock-releasing position to the locking position. Meanwhile, the pushing balls 47 move in the ball-supporting holes 43b outward in the radial direction, while sliding in the inclined-pushing grooves 51, as the cam 41 moves from the lock position to the lock-releasing position.

The mold-side attachments 31 and 33 have a main body 53 each. The main body 53 of the mold-side attachment 31 is secured to the holding plate 27. The main body 53 of the mold-side attachment 33 is secured to the holding plate 29. A cylindrical part 55 is provided on the center part of the main body 53. The cylindrical part 55 has a hollow part having a diameter through which the ball-supporting cylindrical member 43 can be fitted. The cylindrical part 55 has such an outside diameter that it can be inserted into the recess 15 or 17. The cylindrical part 55 has engaging-locking grooves 57 in the inner circumferential surface. Each engaging-locking groove 57 has a groove part and a curved part. The groove part has a prescribed depth and extends from the lower end toward the center in the axial direction. The curved part curves toward the inner circumferential surface of the cylindrical part 55. The engaging-locking groove 57 has a cross section which is arc-shaped as viewed in the direction at right angles to the axis and which approximately corresponds to the surface of the locking ball 45. The engaging-locking grooves 57 are so positioned as to oppose the locking balls 45.

Engaging-pushing grooves 59 are cut in the inner circumferential surface of the cylindrical part 55. Each engaging-pushing grooves 59 has a groove part and a curved part. The grooved part has a prescribed depth and extends from the upper end toward the center in the axial direction. The curved part curves toward the inner circumferential surface of the cylindrical part 55. The engaging-pushing grooves 59 has a cross section which is arc-shaped as viewed in the direction at right angles to the axis and which approximately corresponds to the curved surface of the locking ball 45. The engaging-pushing grooves 59 are so positioned as to oppose the pushing balls 47.

The locking balls 45 move in the ball-supporting holes 43b outward in the radial direction, while sliding in the inclined-locking grooves 49, as the cam 41 moves from the lock-releasing position to the locking position. After the locking balls 45 move into the deep parts of the engaging-locking grooves 57, they engage with the curved parts. The locking balls 45 therefore hold the platen-side attachments 19, preventing the same from slipping from the mold-side attachments 31 and fixing them. The locking balls 45 hold the platen-side attachments 21, too, preventing the same from slipping from the mold-side attachments 33 and fixing them.

The pushing balls 47 move in the ball-supporting holes 43b outward in the radial direction, while sliding in the curved-pushing grooves 51, as the cam 41 moves from the lock position to the lock-releasing position. The pushing balls 47 then abut on the curved parts of the engaging-pushing grooves 59 and push the mold-side attachments 31 from the platen-side attachments 19 to release the attachments 31, and mold-side attachments 33 from the platen-side attachments 21 to release the attachments 33.

In addition, the stationary platen 5 and the movable platen 11 have positioning bars (not shown), which extend in the axial direction of the tie bars 9. The holding plate 27 has bar holes (not shown), which extend in axial alignment with the positioning bars of the stationary platen 5. The holding plate 29 has bar holes (not shown), which extend in axial alignment with the positioning bars of the movable platen 11. When the positioning bars of the stationary platen 5 are inserted into the bar holes of the holding plate 27, and the positioning bars of the movable platen 11 are inserted into the bar holes of the holding plates 29, the holding plates 27 and 29 are positioned with respect to the stationary platen 5 and the movable platen 11, respectively, with their cylindrical part 55 fitted on the ball-supporting cylindrical member 43. The positioning bars and bar holes may be replaced by locating pins (locating rings) that position the holding plates 27 and 29 with respect to the stationary platen 5 and the movable platen 11, respectively.

Next, a method of attaching and detaching metal molds will be explained.

Figure 6:
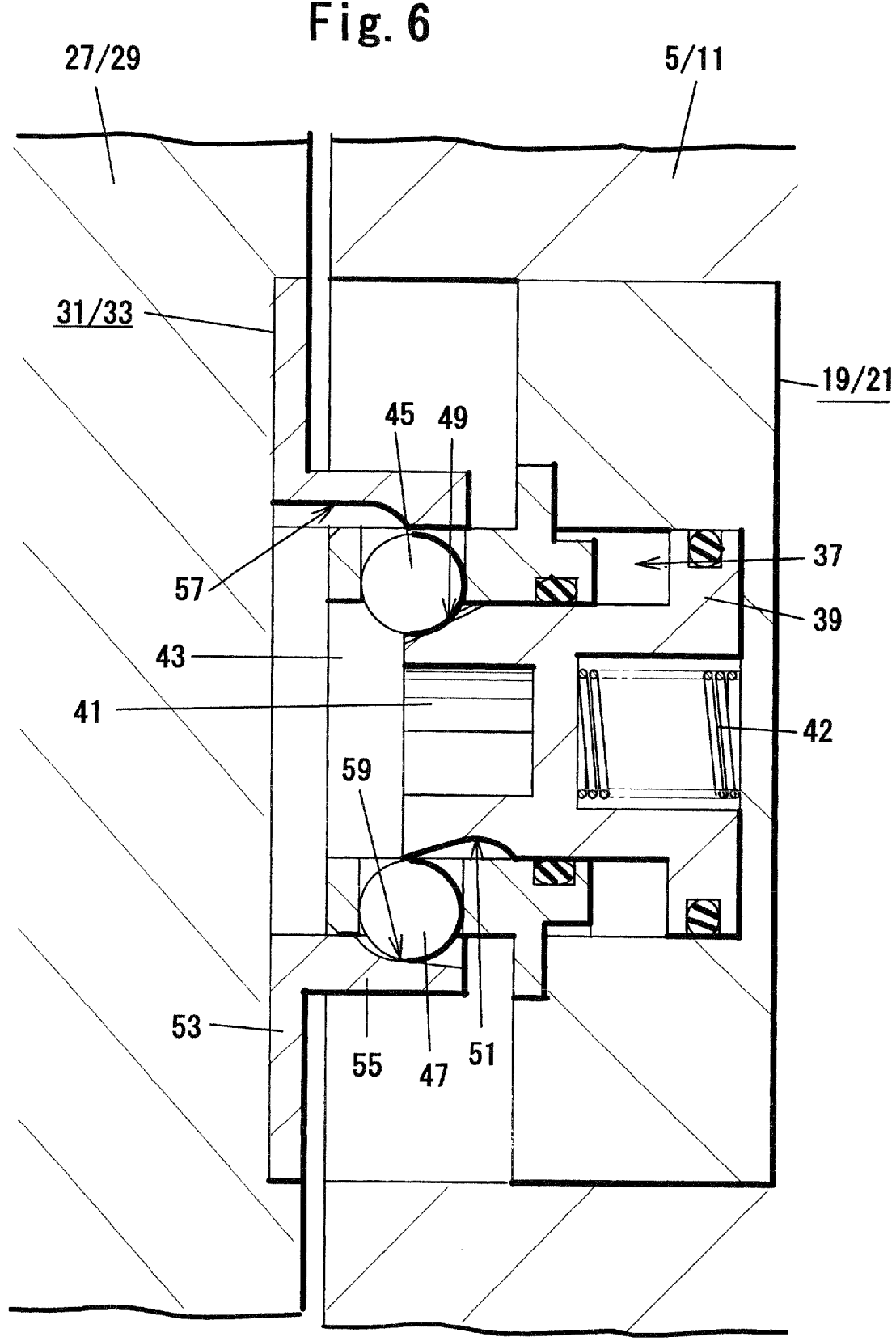
FIG. 6 is a sectional view showing the platen-side attachment aligned with a mold-side attachment.

First, the operator operates a crane (not shown), hanging the holding plates 27 and 29 holding the stationary mold 23 and the movable mold 25, respectively. The operator then positions the holding plates 27 and 29, inserting the positioning bars into the respective bar holes. The ball-supporting cylindrical member 43 is thereby inserted into the associated cylindrical part 55 (see FIG. 6).

In this state, each platen-side attachment 19 is spaced a little from the mold-side attachment 31, and each platen-side attachment 21 is spaced a little from the mold-side attachment 33, with the ball-supporting cylindrical member 43 inserted in a hollow part of the cylindrical part 55. The cam 41 remains at the lock-releasing positions against the elastic force of the compression spring 42, by virtue of the compressed air supplied into the negative pressure chamber of the cylinder chamber 37.

As long as the cam 41 remains at the lock-releasing position, the locking balls 45 abut on the inner circumferential surface of the cylindrical part 55. The locking balls 45 are therefore pushed inwards in the radial direction and moved onto the bottoms of the inclined-locking grooves 49.

The pushing balls 47 supported in the ball-supporting holes 43b are pushed outwards in the radial direction by abutting on the shallow parts of the pushing grooves 51 and therefore located in the deep parts of the pushing grooves 59.

In this condition, the compressed air is discharged from the negative pressure chamber of the cylinder chamber 37. Further, compressed air is supplied into the positive pressure chamber, moving the piston 39, and hence the cam 41, from the lock-releasing position to the locking position. As the cam 41 is so moved, the locking balls 45 are pushed outward in the radial direction, from the bottoms of the inclined-locking grooves 49, rolling on the inclined surfaces of the inclined-locking grooves 49. Therefore, parts of the locking balls 45 are positioned in the deep parts of the engaging-locking grooves 57.

Figure 7:
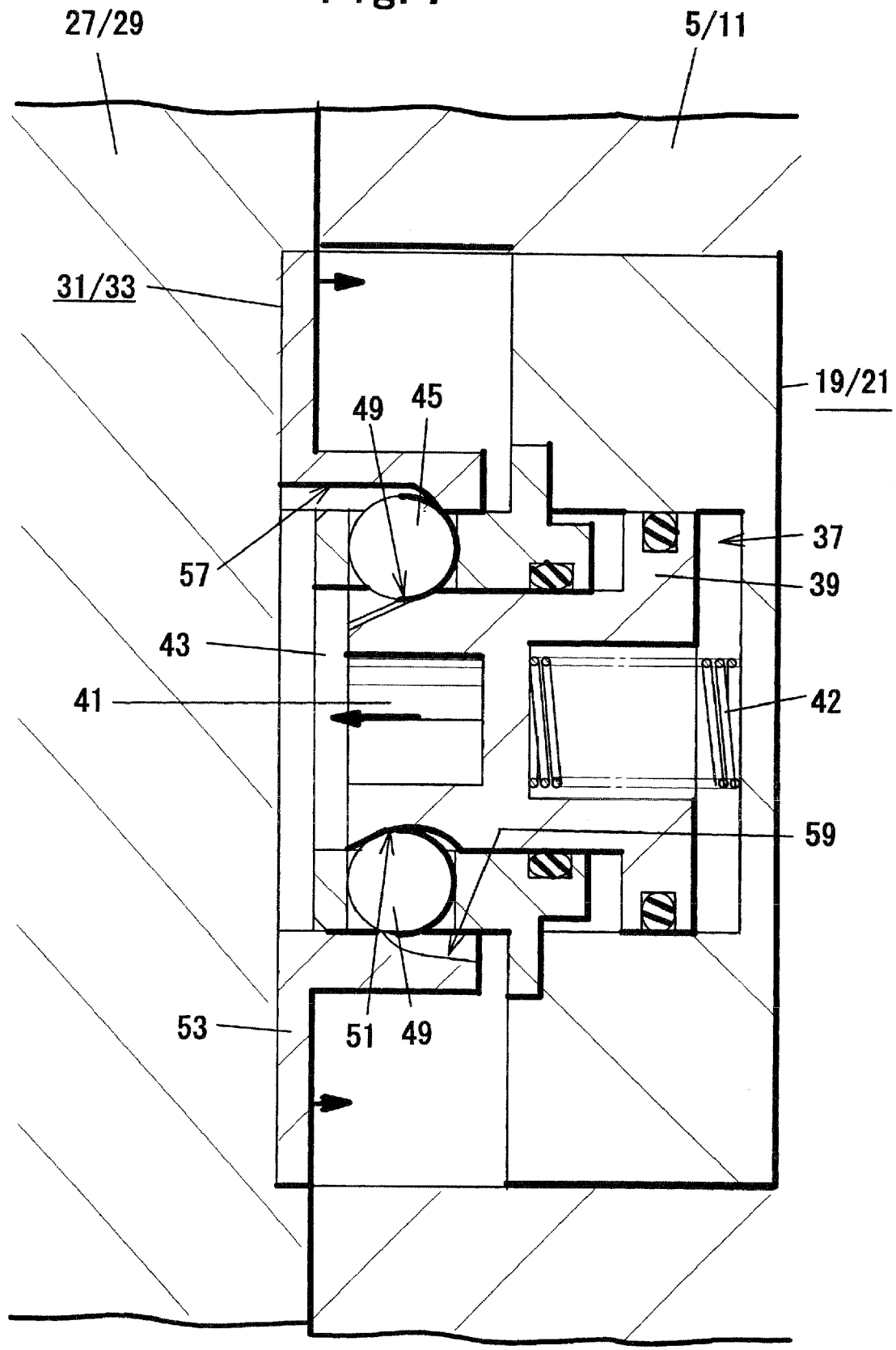
FIG. 7 is a sectional view showing the platen-side attachment and the mold-side attachment that are locked to each other.

As the cam 41 moves to the locking position, the locking balls 45 roll on the inclining surfaces of the shallow parts of inclined-locking grooves 49 until they abut on the curved parts of the engaging-locking grooves 57. Then, each mold-side attachment 31 and each mold-side attachment 33, and hence the holding plates 27 and 29 are moved to the platen-side attachments 19 and the platen-side attachments 21, and hence to the stationary platen 5 and the movable platen 11, respectively. The platen-side attachments and the mold-side attachments are thereby closely attached and fixed to each other as shown in FIG. 7.

When the cam 41 starts moving, the pushing balls 47 supported in the ball-supporting holes 43b are located in the deep parts of the engaging-pushing grooves 59 and do not interfere with the cam 41. Therefore, the pushing balls 47 allow the cam 41 to move toward the locking position. As the cam 41 moves toward the locking position, the mold-side attachments 31 and 33 are pulled toward the platen-side attachments 19 and 21. Then, the pushing balls 47 slide on the curved parts of the engaging-pushing grooves 59 and move in the ball-supporting holes 43b, projecting inwards in the radial direction. The pushing balls 47 are therefore located in the deep parts of the curved-pushing grooves 51.

In the present embodiment, as the cam 41 moves from the lock-releasing position to the locking position, the locking balls 45 are moved in the ball-supporting holes 43b, outward in the radial direction, and are thereby engaged with the engaging-locking grooves 57. In this state, the mold-side attachments 31 and 33 are pulled toward the platen-side attachments 19 and 21, respectively, pushing the locking balls 45 onto the inclining surfaces of the shallow parts of the inclined-locking grooves 49. The mold-side attachments 31 and 33 are thereby thoroughly locked and firmly fixed to the platen-side attachments 19 and 21, respectively.

To release the mold-side attachments 31 and 33 from the platen-side attachments 19 and 21, compressed air is supplied into the negative pressure chamber of the cylinder chamber 37, while the compressed air is discharged from the positive pressure chamber of the cylinder chamber 37. Thus, the piston 39, and hence the cam 41, are moved from the locking position toward the lock-releasing position, against the elastic force of the compression spring 42.

Figure 8:
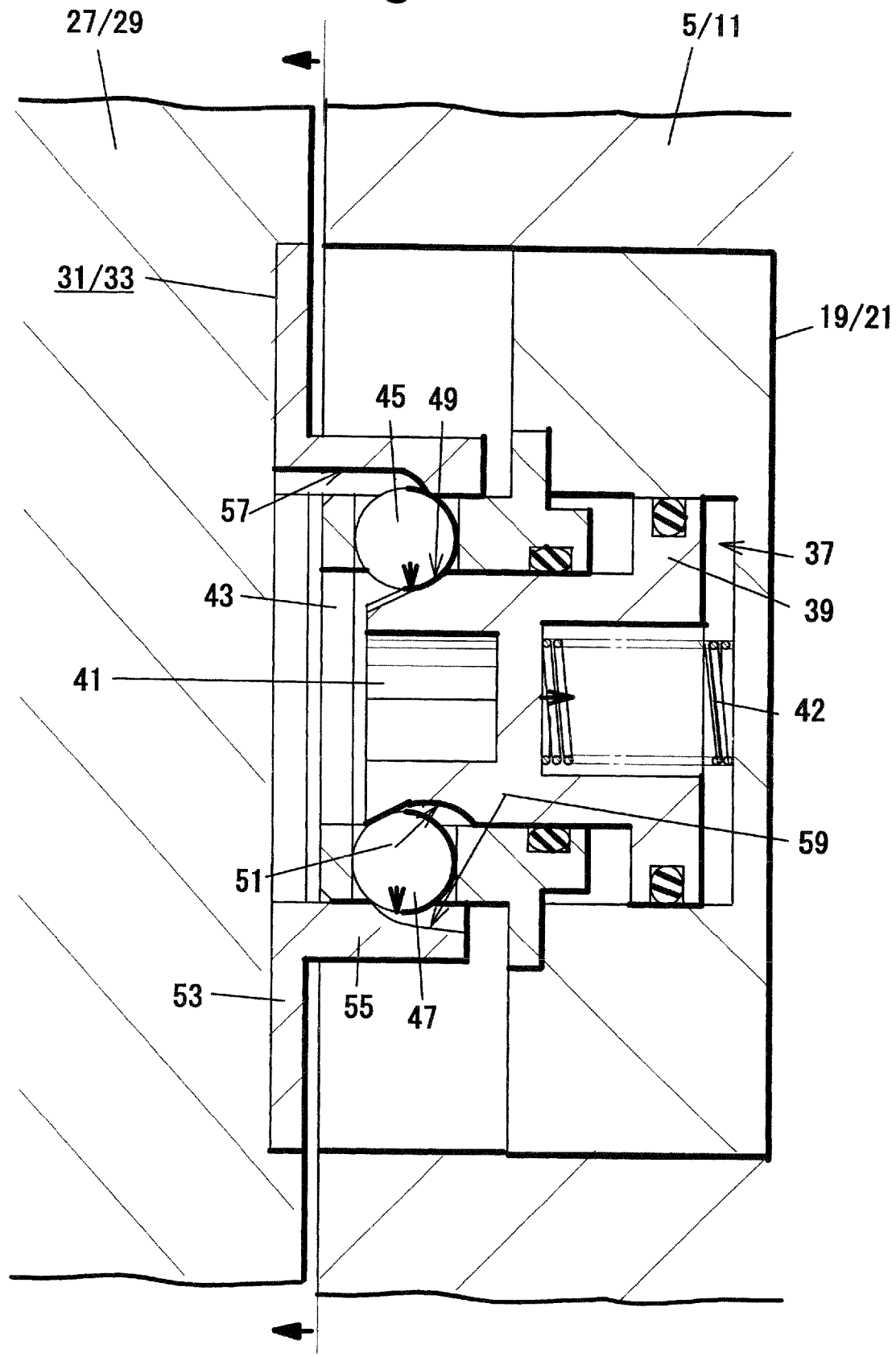
FIG. 8 is a sectional view illustrating a cam that has just started moving from a locking position to a lock-releasing position.

At this point, the pushing balls 47 located in the deep parts of the curved-pushing grooves 51 slides to the shallow parts thereof as the cam 41 moves toward the lock-releasing position. The pushing balls 47 are then pushed outward in the radial direction, abutting on the curved parts of the engaging-pushing grooves 59. The mold-side attachments 31 and 33 are thereby pushed away from the platen-side attachments 19 and 21, respectively (see FIG. 8).

As the cam 41 further moves toward the lock-releasing position, the deep parts of the inclined-locking grooves 49 come to face the locking balls 45 engaged with the curved parts of the engaging-locking grooves 57. Therefore, the locking balls 45 are no longer pushed outward in the radial direction. Hence, the locking balls 45 can move inwards in the radial direction.

Figure 9:
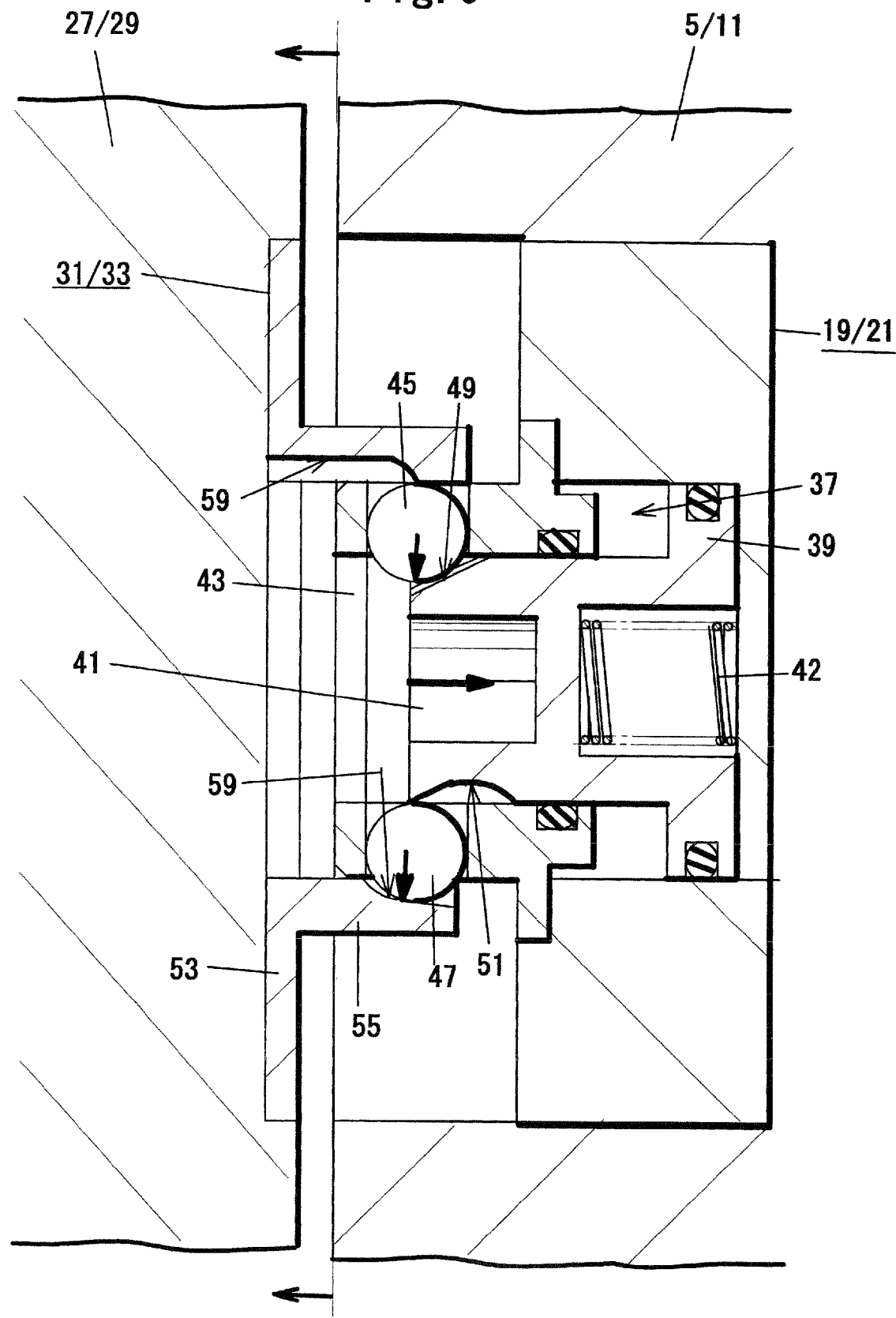
FIG. 9 is a sectional view illustrating the mold-side attachment protruding from the platen-side attachment.

Then, the pushing balls 47 push the mold-side attachments 31 and 33 away from the platen-side attachments 19 and 21, respectively. The ball-supporting cylindrical member 43 is therefore pulled out of the hollow of the cylindrical part 55. As the member 43 is so pulled out, the locking balls 45 slide on the curved parts of the engaging-locking grooves 57, rolling into the deep parts of the inclined-locking grooves 49. The locking balls 45 are thus released from the engaging-locking grooves 57 (see FIG. 9).

In the present embodiment, the pushing balls 47 are moved in the ball-supporting holes 43b, outward in the radial direction, as the cam 41 moves from the locking position to the lock-releasing position. The pushing balls 47 then abut on the curved parts of the engaging-pushing grooves 59, whereby the mold-side attachments 31 and 33 are pushed and forcibly separated from the platen-side attachments 19 and 21. As a result, the detaching operation of the molds 23 and 25 from the platens 5 and 7, respectively can be facilitated.

The operating member according to this invention is not limited to a hydraulic cylinder. Instead, it may be an electromagnetic solenoid having a plunger and a cam secured to the plunger.

What is claimed is:

1. A mold attaching/detaching apparatus for detachably attaching a stationary metal mold to a stationary platen and detachably attaching a movable metal mold to a movable platen of a molding machine, the apparatus comprising:
   a plurality of platen-side attachments secured to the stationary platen and the movable platen, and
   a plurality of mold-side attachments secured to the stationary metal mold and the movable metal mold,
   wherein each of the platen-side attachments includes:
      a cam which moves between a locking position and a lock-releasing position, and which has inclined-locking grooves and inclined-pushing grooves, each groove being formed on an outer circumferential surface of the cam;
      an operating member which is adapted to move the cam back and forth;
      a ball-supporting member which is adapted to be inserted with the cam and which has ball-supporting holes, each hole having an axis extending at right angles to a direction in which the cam moves;
      a plurality of locking balls each of which is supported in one of the ball-supporting holes, is adapted to face one of the inclined-locking grooves, and is movable in the direction at right angles to the direction in which the cam moves; and
      a plurality of pushing balls each of which is supported in one of the ball-supporting holes, is adapted to face one of the inclined-pushing grooves, and is movable in the direction at right angles to the direction in which the cam moves,
   wherein each of the mold-side attachments includes:
      a ball-receiving member which has: (i) a hollow part that is adapted to be inserted with the ball-supporting member, (ii) engaging-locking grooves each groove being formed in an inner surface and adapted to face one of the locking balls, and (iii) engaging-pushing grooves each groove being formed in the inner surface and adapted to face one of the pushing balls,
   wherein when the cam moves from the lock-releasing position to the locking position while the ball-supporting member remains inserted in the ball-receiving member, the locking balls slide on respective inclined-locking grooves of the cam, and are moved outward in directions at right angles to the direction in which the cam moves, and are thereby set in respective engaging-locking grooves of the ball-receiving member, thereby fixing the mold-side attachment to the platen-side attachment, and
   wherein when the cam moves from the locking position to the lock-releasing position while the ball-supporting member remains inserted in the ball-receiving member, the pushing balls slide on respective inclined-pushing grooves of the cam, and are moved outward in directions at right angles to the direction in which the cam moves, and are thereby abut on respective engaging-pushing grooves of the ball-receiving member, thereby projecting the mold-side attachment from the platen-side attachment.

2. The mold attaching/detaching apparatus according to claim 1, wherein:
   each platen-side attachment is secured in a recess made in one of the stationary platen and the movable platen, and each mold-side attachment is secured in a recess made in one of the stationary metal mold and the movable metal mold.

3. A mold attaching/detaching method of detachably attaching a stationary metal mold to a stationary platen and detachably attaching a movable metal mold to a movable platen of a molding machine, the method comprising:
   moving a cam provided in a platen-side attachment from a lock-releasing position to a locking position while a mold-side attachment fixed to the stationary or movable metal mold remains inserted in the platen-side attachment provided on the stationary platen or the movable platen, wherein the moving of the cam to the locking position causes a locking ball to slide on an inclined-locking groove formed on the cam, and to be pushed outward in a direction at right angles to a direction in which the cam moves, and to thereby engage with an engaging-locking groove made in a ball-receiving member of the mold-side attachment, thereby fixing the mold-side attachment to the platen-side attachment; and
   moving the cam from the locking position to the lock-releasing position while the mold-side attachment remains inserted in the platen-side attachment, wherein the moving of the cam to the lock-releasing position causes a pushing ball to slide on an inclined-pushing groove formed on the cam, and to be pushed outward in a direction at right angles to the direction in which the cam moves, and to thereby abut on an engaging-pushing groove made in the ball-receiving member, thereby projecting the mold-side attachment from the platen-side attachment.

* * * * *